United States Patent [19]
Mochizuki

[11] Patent Number: 6,009,211
[45] Date of Patent: Dec. 28, 1999

[54] HADAMARD TRANSFORM COEFFICIENT PREDICTOR

[75] Inventor: Takashi Mochizuki, Tokyo, Japan

[73] Assignee: NEC Corporation, Tokyo, Japan

[21] Appl. No.: 08/989,074

[22] Filed: Dec. 11, 1997

[30] Foreign Application Priority Data

Dec. 13, 1996 [JP] Japan .................................... 8-352669

[51] Int. Cl.⁶ ............................................... G06F 15/332
[52] U.S. Cl. ......................... 382/281; 382/246; 382/248; 358/262.1
[58] Field of Search .................................. 382/281, 232, 382/238, 244–248; 358/262.1, 261.2, 261.3, 426–427, 430; 364/725.01, 726.01, 727.01; 348/400–418, 422, 394–395

[56] References Cited

U.S. PATENT DOCUMENTS

| | | | |
|---|---|---|---|
| 3,984,626 | 10/1976 | Mounts et al. ........................... | 348/400 |
| 4,580,162 | 4/1986 | Mori ........................................ | 348/400 |
| 4,772,946 | 9/1988 | Hammer .................................. | 348/406 |
| 5,001,559 | 3/1991 | Gonzales et al. ....................... | 348/400 |
| 5,751,856 | 5/1998 | Hirabayashi ............................ | 382/232 |
| 5,805,293 | 9/1998 | Mochizuki ............................. | 358/262.1 |

FOREIGN PATENT DOCUMENTS

| | | | |
|---|---|---|---|
| 0 388 043 A1 | 9/1990 | European Pat. Off. ......... | H03M 7/42 |
| 0 724 364 A2 | 7/1996 | European Pat. Off. ......... | H04N 7/30 |
| 57-38083 | 3/1982 | Japan ............................... | H04N 7/12 |
| 60-182221 | 9/1985 | Japan ............................... | H03M 7/00 |
| 2-298183 | 12/1990 | Japan ............................... | G06K 9/36 |
| 8-205160 | 8/1996 | Japan ............................... | H04N 1/411 |

OTHER PUBLICATIONS

Mochizuki, "AC coefficient prediction for the Hadamard transform and its application to image coding", Information Tech. Res. Labs, NEC, vol. 96, No. 544, 15–22 (1997).
Mochizuki, "In–block prediction between Hadamard transform coefficients", Information Tech. Res. Labs, NEC Corp., 50, (1997)—D–11–50.

*Primary Examiner*—Leo H. Boudreau
*Assistant Examiner*—Ishrat Sherali
*Attorney, Agent, or Firm*—Foley & Lardner

[57] ABSTRACT

In an Hadamard transform coefficient predictor for 8-point and/or 8×8-point Hadamard transform, when the transform coefficients of one-dimensional 8-point Hadamard transform are represented by y(0), y(1), . . . , y(7) from the lowest order, y(1) is multiplied by ½ and output as a prediction value of y(3), y(2) is multiplied by ¼ and output as a prediction value of y(4), y(2) is multiplied by ½ and output as a prediction value of y(6), and y(1) is multiplied by ¼ and output as a prediction value of y(7). Alternatively, when a and b represent real numbers which are above zero and below 1, the multiplication value of y(2) and b/2 and the multiplication value of y(4) and (2−2b) are added to each other, and the addition result is output as a prediction value of y(6). Further, the multiplication value of y(1) and a/4 and the multiplication value of y(3) and (1−a)/2 are added and the addition result is output as a prediction value of y(7). The same construction is also applicable for the two-dimensional 8×8 Hadamard transform.

1 Claim, 9 Drawing Sheets

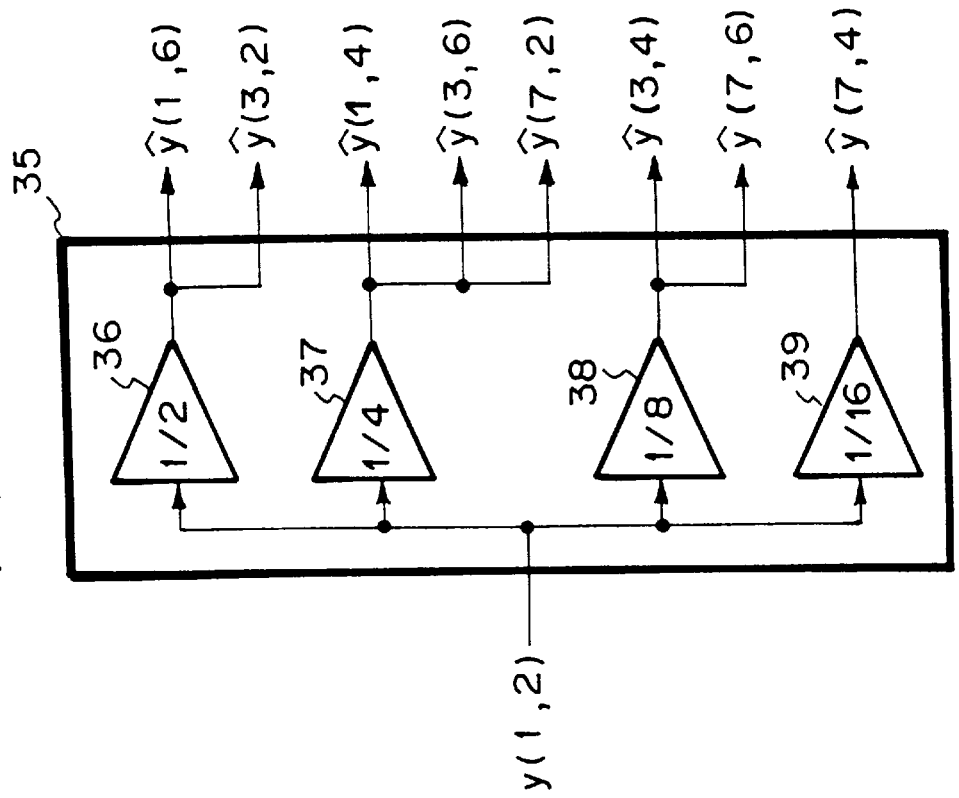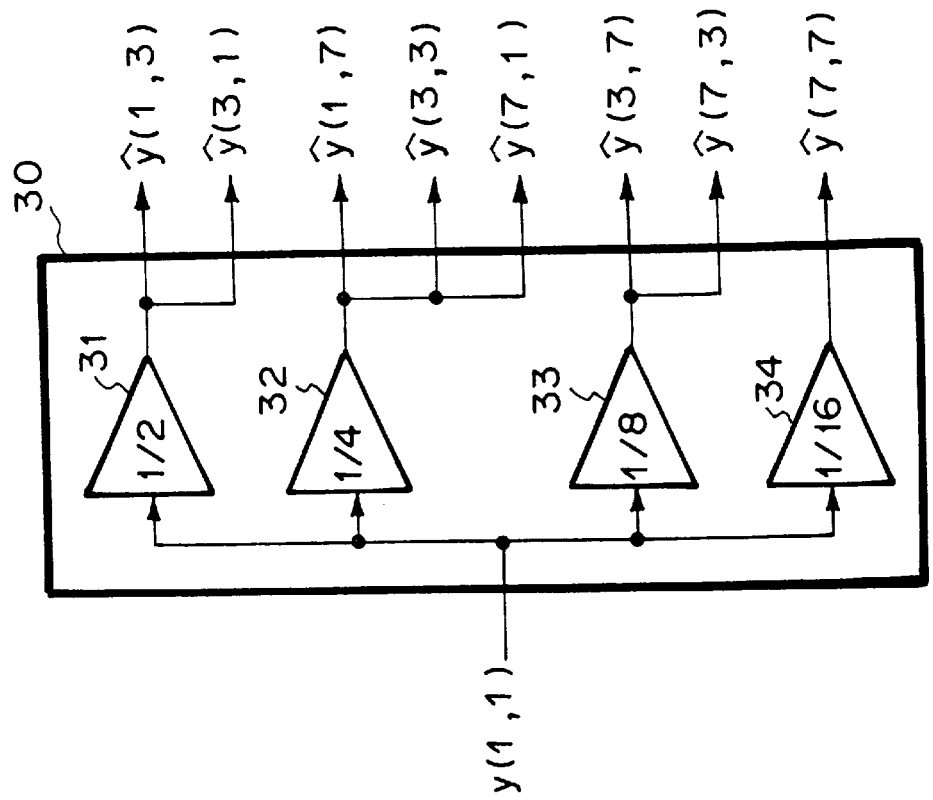

F I G.5
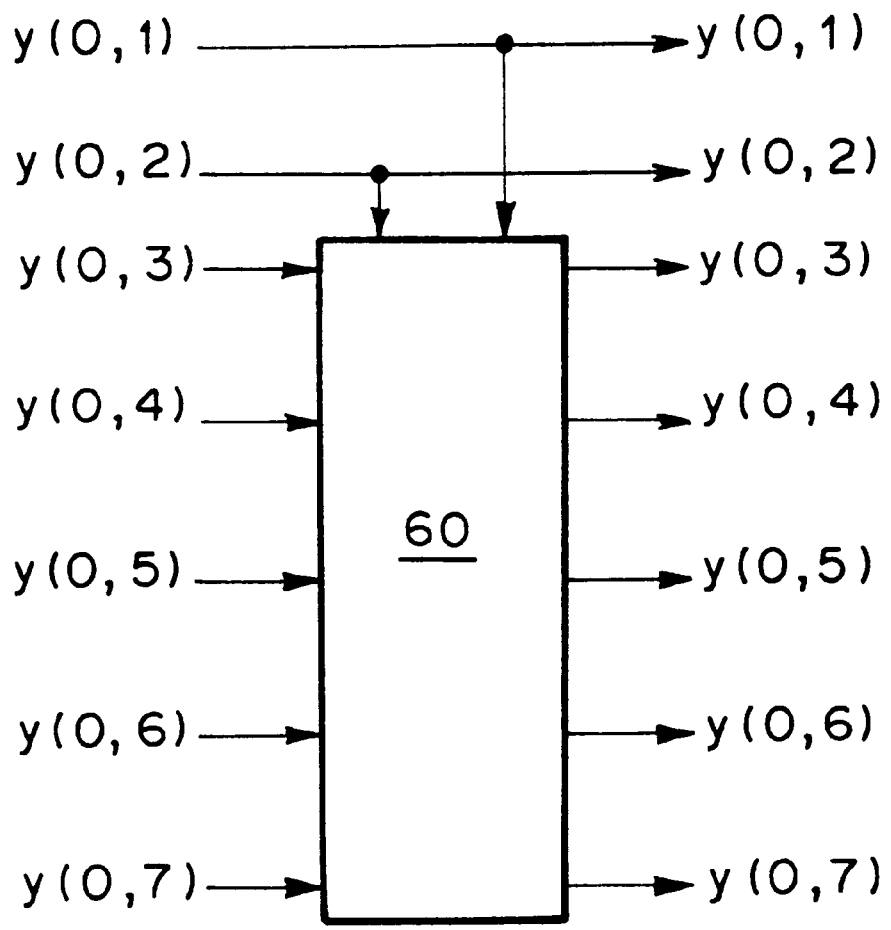

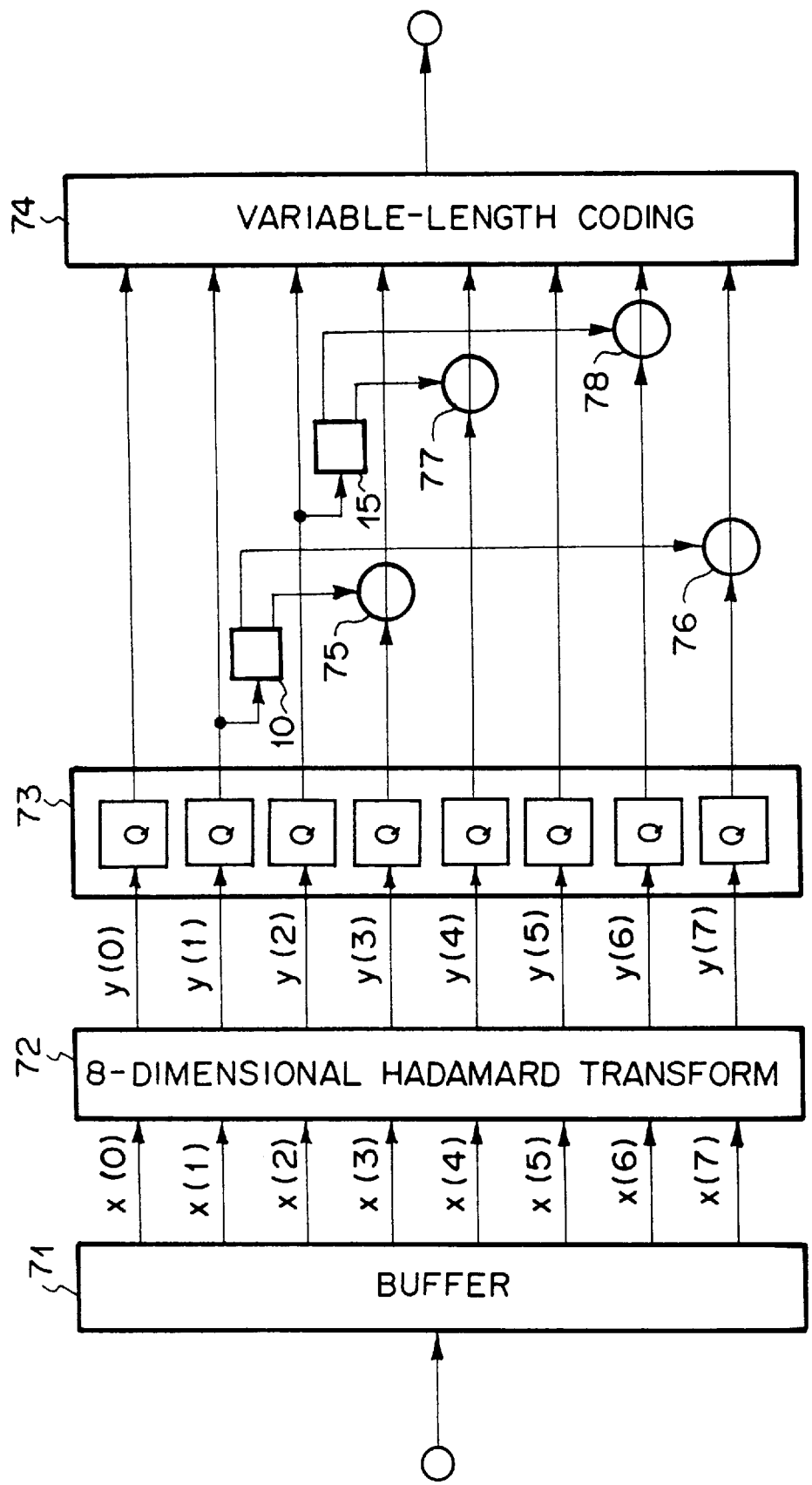

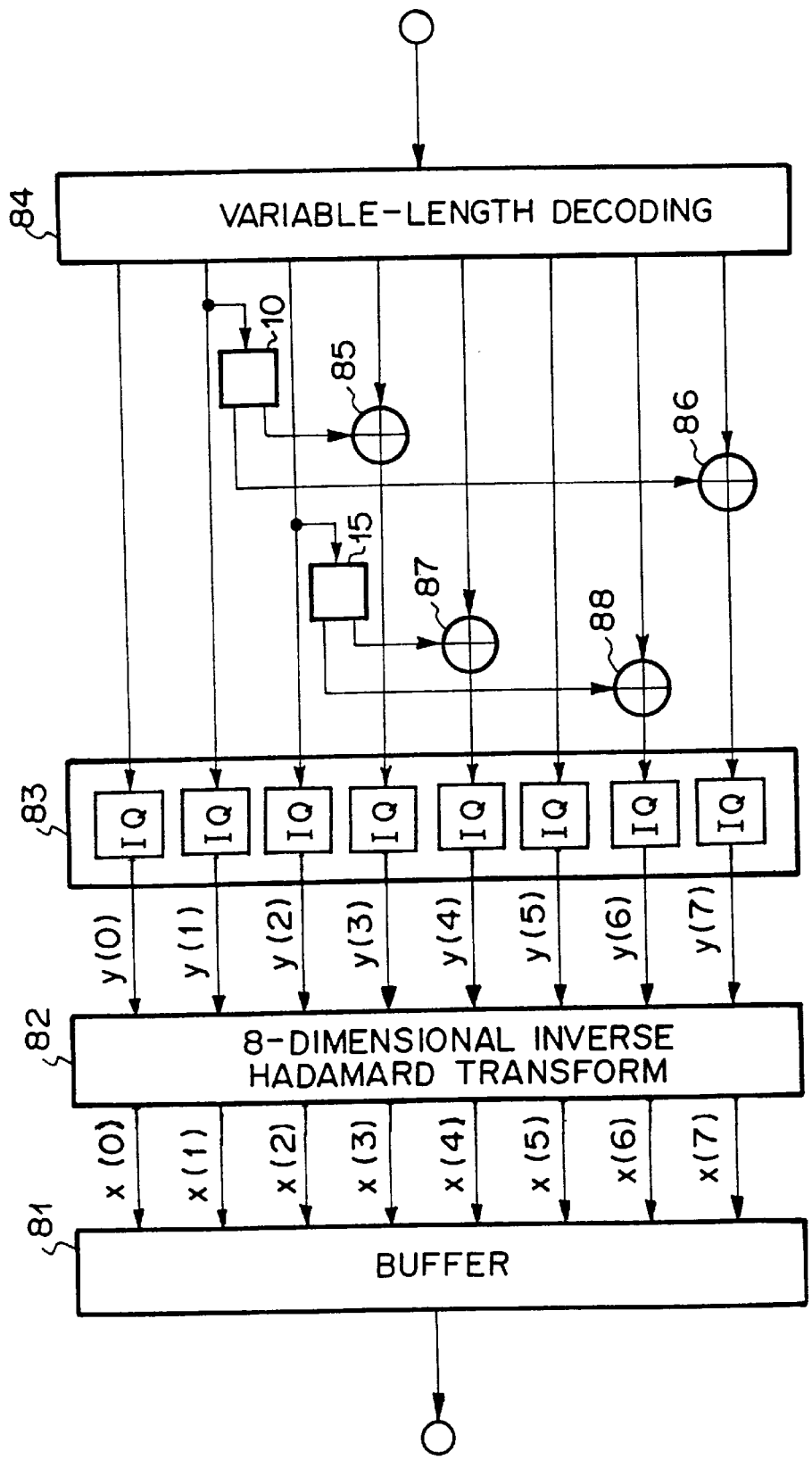

FIG. 9

| Dnw | Dn | Dne |
|---|---|---|
| Dw | Dc | De |
| Dsw | Ds | Dse |

PRIOR ART  FIG. 10

| v \ u | 0 | 1 | 2 | 3 | 4 | 5 | 6 | 7 |
|---|---|---|---|---|---|---|---|---|
| 0 | — | b10 | b20 | $\frac{b10}{2}$ | $\frac{b20}{4}$ | 0 | $\frac{b10}{2}$ | $\frac{b20}{4}$ |
| 1 | b01 | b11 | b21 | $\frac{b11}{2}$ | $\frac{b21}{4}$ | 0 | $\frac{b11}{2}$ | $\frac{b21}{4}$ |
| 2 | b02 | b12 | b22 | $\frac{b12}{2}$ | $\frac{b22}{4}$ | 0 | $\frac{b12}{2}$ | $\frac{b22}{4}$ |
| 3 | $\frac{b01}{2}$ | $\frac{b11}{2}$ | $\frac{b21}{2}$ | $\frac{b11}{4}$ | $\frac{b21}{8}$ | 0 | $\frac{b21}{4}$ | $\frac{b11}{8}$ |
| 4 | $\frac{b02}{4}$ | $\frac{b12}{4}$ | $\frac{b22}{4}$ | $\frac{b12}{8}$ | $\frac{b22}{16}$ | 0 | $\frac{b22}{8}$ | $\frac{b12}{16}$ |
| 5 | 0 | 0 | 0 | 0 | 0 | 0 | 0 | 0 |
| 6 | $\frac{b02}{2}$ | $\frac{b12}{2}$ | $\frac{b22}{2}$ | $\frac{b12}{4}$ | $\frac{b22}{8}$ | 0 | $\frac{b22}{4}$ | $\frac{b12}{8}$ |
| 7 | $\frac{b01}{4}$ | $\frac{b11}{4}$ | $\frac{b21}{4}$ | $\frac{b11}{8}$ | $\frac{b21}{16}$ | 0 | $\frac{b21}{8}$ | $\frac{b11}{16}$ |

HADAMARD TRANSFORM COEFFICIENT PREDICTOR

BACKGROUND OF THE INVENTION

1. Field of the Invention

The present invention relates to a signal processor, and more particularly to an Hadamard transform coefficient predictor which is applied to compression and decompression of image signal processing, and suitably used by using Hadamard transform of 8 points or 8×8 points.

2. Description of the Related Art

There is known a system which uses Hadamard transform for an coding system of audio signals and video signals. According to a general coding system using Hadamard transform, an input signal is sectioned into plural blocks, Hadamard transform is performed on each block to calculate transform coefficients for the block, and then the transform coefficients are subjected to variable-length coding processing.

The 8-point Hadamard transform is defined by the following equation (1). The inverse Hadamard transform is also defined by the same equation (1) although the input/output is merely exchanged to each other.

$$\begin{bmatrix} y(0) \\ y(1) \\ y(2) \\ y(3) \\ y(4) \\ y(5) \\ y(6) \\ y(7) \end{bmatrix} = (\sqrt{2}/4) \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} x(0) \\ x(1) \\ x(2) \\ x(3) \\ x(4) \\ x(5) \\ x(6) \\ x(7) \end{bmatrix} \quad \text{[Equation 1]}$$

A transform coefficient $y(0)$ of the lowest order of the Hadamard transform is a value which is proportional to the average value of the block, and it is hereinafter referred to as "DC coefficient". The transform coefficients other than the DC coefficient are generally referred to as "AC coefficients".

In Japanese Laid-open Patent Application No Hei-8-205160 which was filed by the inventor of this applicant, a method of calculating a bit pattern of a transform coefficient in a block is proposed as a conventional method using Hadamard transform. This publication discloses a procedure of calculating a bit pattern for 8-point Hadamard transform case and 8×8-point Hadamard transform case respectively by utilizing the in-block mutual relationship between lower-order bits of transform coefficients. The residual bit pattern is calculated from a half number of bits, for example, three bits of lower order for the 8-point transform case and six bits of lower order for the 8×8 Hadamard transform.

Further, according to a paper (1) (Takashi Mochizuki, "Improvement of Coding Efficiency of Hadamard Transform Reversible Coding based on Prediction of AC Coefficients", Lecture Papers D-218 of Information/System Society Convention of 1996 of The Institute of Electronics, Information and Communication Engineers, a method of predicting AC coefficients of a block at the center from the DC coefficients at the neighboring (surrounding) blocks on the assumption that an input signal varies smoothly is proposed by the inventor of this application. The above paper (1) handles the 8×8 Hadamard transform, and when the average values of nine blocks are arranged as shown in FIG. 9, the prediction values of transform coefficients y (u,v) in horizontal u-order and vertical v-order are shown in FIG. 10.

In FIG. 10, the transform coefficients b10, b01, b02, b20, b11, b12 b21, b22 indicates the following equation:

b10=$Dw-De$, b01=$Dn-Ds$, b20=$(Dw-2Dc+De)/4$, b02=$(Dn-2Dc+Ds)/4$, b11=$(Dnw-Dne-Dsw+Dse)/8$, b21={$(Dnw-2Dn+Dne)-(Dsw-2Ds+Dse)$}/32 b12={$(Dnw-2Dw+Dsw)-(Dne-2De+Dse)$}/32, b22={$(4Dc-2(Dn+Dw+De+Ds)+(Dnw+Dne+Dsw+Dse))/128$

However, it is the present situation that no method of predicting the values of the transform coefficients in the block has been proposed. According to the method disclosed in Japanese-laid open patent application No. Hei-8-205160, the pattern of the lower-order bits of the transform coefficients can be calculated, however, no consideration is made on the higher-order bits. Further, according to the method disclosed in the paper (1), the AC coefficients of the center block cannot be predicted unless the DC coefficients of the neighboring blocks are known.

SUMMARY OF THE INVENTION

Therefore, the present invention has been implemented in view of the foregoing situation, and has an object to provide a predictor for predicting the values of transform coefficients of higher-order from the values of transform coefficients of lower-order in a block.

In order to attain the above object, a first transform coefficient predictor according to the present invention is characterized in that when the transform coefficients of one-dimensional 8-point Hadamard transform are represented by $y(0), y(1), \ldots, y(7)$ in the order from the lowest order, $y(1)$ is input and then multiplied by ½ to be output as a prediction value of $y(3)$ while multiplied by ¼ to be output as a prediction value of $y(7)$.

A second transform coefficient predictor according to the present invention is characterized in that when the transform coefficients of one-dimensional 8-point Hadamard transform are represented by $y(0), y(1), \ldots, y(7)$ in the order from the lowest order, $y(2)$ is input and then multiplied by ¼ to be output as a prediction value of $y(4)$ while $y(2)$ is multiplied by ½ to be output as a prediction value of $y(6)$.

A third transform coefficient predictor according to the present invention is characterized in that when the transform coefficients of one-dimensional 8-point Hadamard transform are represented by $y(0), y(1), \ldots, y(7)$ in the order from the lowest order and a represents a real number between 0 and 1, said third transform coefficient predictor includes a first multiplier for receiving y(1) and multiplying y(1) by a/4, a second multiplier for receiving y(3) and multiplying y(3) by (1−a)/2, and an adder for adding the outputs of the first and second multipliers, the output of the adder being output as a prediction value of y(7).

A fourth transform coefficient predictor according to the present invention is characterized in that when the transform coefficients of one-dimensional 8-point Hadamard transform are represented by y(0), y(1), . . . , y(7) in the order from the lowest order and b represents a real number between 0 and 1, the fourth transform coefficient predictor includes a first multiplier for receiving y(2) and multiplying y(2) by b/2, a second multiplier for receiving y(4) and multiplying y(4) by (2−2b), and an adder for adding the outputs of the first and second multipliers, the output of the adder being output as a prediction value of y(6).

A fifth transform coefficient predictor according to the present invention is characterized that a=½ in the third transform coefficient predictor.

A sixth transform coefficient predictor according to the present invention is characterized in that when the transform coefficients of one-dimensional 8-point Hadamard transform are represented by y(0), y(1), . . . , y(7) in the order from the lowest order, the sixth transform coefficient predictor includes a multiplier for receiving y(2) and y(4) and multiplying y(2) by ¼, and an adder for adding the output of the multiplier with y(4), the output of the adder being output as a prediction value of y(6).

A seventh transform coefficient predictor according to the present invention is characterized in that when the transform coefficients of two-dimensional 8×8-point Hadamard transform are represented by y(0,0), y(0,1), . . . , y(7,7), y(1,1) is input, and then y(1,1) is multiplied by ½ to be output as prediction values of y(1,3) and y(3,1) , y(1,l) is multiplied by ¼ to be output as prediction values of y(1,7), y(3,3) and y(7,1), y(1,1) is multiplied by ⅛ to be output as prediction values of y(3,7) and y(7,3), and y(1,1) is multiplied by ¹⁄₁₆ to be output as a prediction value of y(7,7).

An eighth transform coefficient predictor according to the present invention is characterized in that when the transform coefficients of two-dimensional 8×8-point Hadamard transform are represented by y(0,0), y(0,1), . . . , y(7,7), y(1,2) is input, and then y(1,2) is multiplied by ½ to be output as prediction values of y(1,6) and y(3,2) , y(1,2) is multiplied by ¼ to be output as prediction values of y(1,4), y(3,6) and y(7,2), y(1,2) is multiplied by ⅛ to be output as prediction values of y(3,4) and y(7,6), and y(1,2) is multiplied by ¹⁄₁₆ to be output as a prediction value of y(7,4).

A ninth transform coefficient predictor according to the present invention is characterized in that when the transform coefficients of two-dimensional 8×8-point Hadamard transform are represented by y(0,0), y(0,1), . . . , y(7,7), y(2,1) is input, and then y(2,1) is multiplied by ½ to be output as prediction values of y(2,3) and y(6,1) , y(2,1) is multiplied by ¼ to be output as prediction values of y(2,7), y(4,1) and y(6,3), y(2,1) is multiplied by ⅛ to be output as prediction values of y(4,3) and y(6,7), and y(2,1) is multiplied by ¹⁄₁₆ to be output as a prediction value of y(4,7).

A tenth transform coefficient predictor according to the present invention is characterized in that when the transform coefficients of two-dimensional 8×8-point Hadamard transform are represented by y(0,0), y(0,1), . . . , y(7,7), y(2,2) is input, and then y(2,2) is multiplied by ½ to be output as prediction values of y(2,6) and y(6,2) , y(2,2) is multiplied by ¼ to be output as prediction values of y(2,4), y(4,2) and y(6,6), y(2,2) is multiplied by ⅛ to be output as prediction values of y(4,6) and y(6,4), and y(2,2) is multiplied by ¹⁄₁₆ to be output as a prediction value of y(4,4).

The principle of the presents invention will be hereunder described.

When the prediction value of the transform coefficient y(u,v) of two-dimensional 8×8-point Hadamard transform is represented by yˆ(u,v), the following relational expressions are satisfied from FIG. 10:

$$y^\wedge(3, 0) = y^\wedge(1, 0)/2,$$

$$y^\wedge(4, 0) = y^\wedge(2, 0)/4$$

$$y^\wedge(5, 0) = 0,$$

$$y^\wedge(6, 0) = y^\wedge(2, 0)/2$$

$$= 2y^\wedge(4, 0),$$

$$y^\wedge(7, 0) = y^\wedge(1, 0)/4$$

$$= y^\wedge(3, 0)/2$$

These relational expressions are also applicable to the transform coefficients of the one-dimensional 8-point Hadamard transform.

In the first transform coefficient predictor (claim 1) of the present invention, the following relation is utilized:

$$y\dot{}(3)=y\dot{}(1)/2, \text{ and}$$

$$y\dot{}(7)=y\dot{}(1)/4.$$

In the second transform coefficient predictor (claim 2) of the present invention, the following relation is utilized:

$$y\dot{}(4)=y\dot{}(2)/4 \text{ and}$$

$$y\dot{}(6)=y\dot{}(2)/2.$$

In the third transform coefficient predictor (claim 3), the following relation is utilized, and the prediction value of y(7) from y(1) And y(3) is averaged by weight a:

$$y^\wedge(7) = y^\wedge(1)/4$$

$$= y^\wedge(3)/2$$

In the fifth transform coefficient predictor (claim 5) of the present invention, a=½.

In the fourth transform coefficient predictor (claim 4) of the present invention, the following relation is utilized, and the prediction value of y(6) from y(2) and y(4) is averaged by weight b:

$$y^\wedge(6) = y^\wedge(2)/2$$

$$= 2y^\wedge(4).$$

In the sixth transform coefficient predictor (claim 6) of the present invention, b=½, and y(4) is directly used as the prediction value from y(4), and thus the multiplication can be omitted.

The seventh to tenth transform coefficient predictors also use the relation between the prediction values in FIG. 10.

BRIEF DESCRIPTION OF THE DRAWINGS

FIGS. 2A and 2B are block diagrams showing the construction of a mode of the transform coefficient predictor according to the present invention;

FIG. 5 is a block diagram showing the construction of a main portion of an embodiment of a supplement device of a two-dimensional 8×8-point Hadamard transform coefficient to which the present invention is applied;

FIG. 6 is a block diagram showing an embodiment of an encoder/decoder for one-dimensional 8-point Hadamard transform coding to which the present invention is applied;

FIG. 7 is a block diagram showing an embodiment of an encoder/decoder for one-dimensional 8-point Hadamard transform coding to which the present invention is applied;

FIG. 9 is a diagram showing an arrangement of block average values to explain the principle of the paper (1); and FIG. 10 is a diagram showing the prediction values of transform coefficients in the paper (1).

DETAILED DESCRIPTION OF THE PREFERRED EMBODIMENTS

Next, preferred embodiments according to the present invention will be described with reference to the accompanying drawings.

FIGS. 1 to 3 show the construction of a transform coefficient predictor according to a preferable mode of the present invention.

In FIGS. 1A to 1D, predictors 10, 15, 20 and 25 are predictors for one-dimensional 8-point Hadamard transform.

Figure 1B:
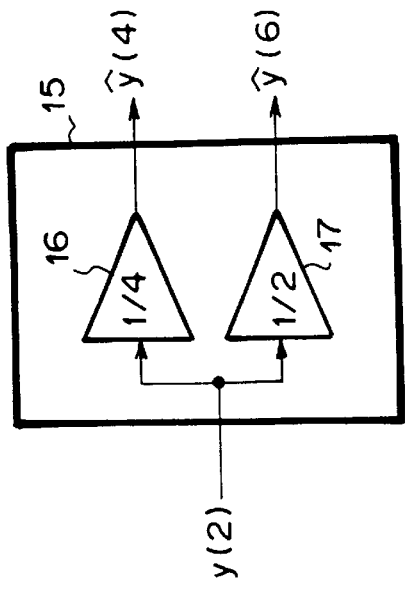
FIGS. 1A to 1D are block diagrams showing the construction of a mode of a transform coefficient predictor according to the present invention.
Figure 1D:
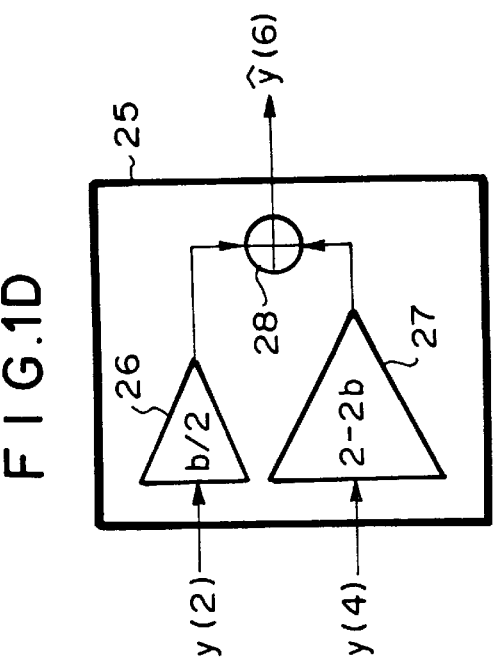
Figure 1A:
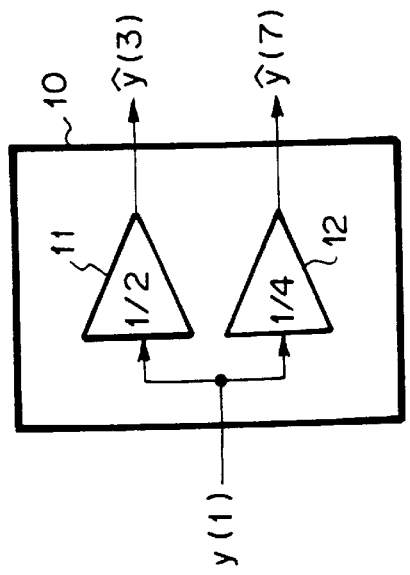

Referring to FIG. 1A, the predictor 10 receives a transform coefficient y(1) and outputs prediction values of transform coefficients y(3) and y(7). For prediction of the transform coefficient y(3), y(1) is multiplied by ½ in a multiplier 11 and then output. For prediction of the transform coefficient y(7), y(1) is multiplied by ¼ in a multiplier 12, and then output.

Referring to FIG. 1B, the predictor 15 receives the transform coefficient y(2) and outputs the prediction values of the transform coefficients y(4) and y(6). For the prediction of the transform coefficient y(4), y(2) is multiplied by ¼ in the multiplier 16, and for the prediction of the transform coefficient y(6), y(2) is multiplied by ½ in the multiplier 17.

Figure 1C:
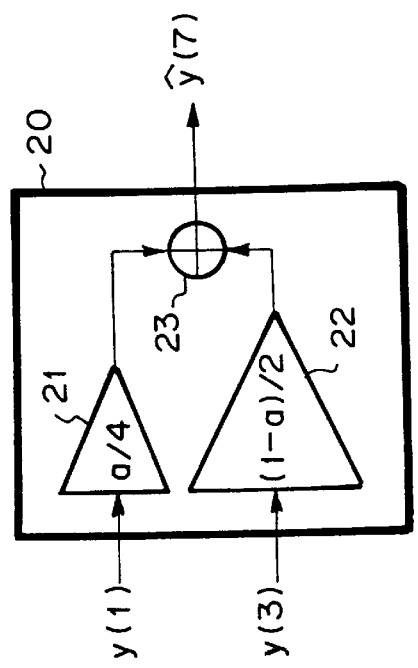

Next, referring to FIG. 1C, the predictor 20 receives the transform coefficients y(1) and y(3), and outputs the prediction value of the transform coefficient y(7). When a represents a real number which is above zero and below 1, y(1) is multiplied by a/4 in the multiplier 21, y(3) is multiplied by (1−a)/2 in the multiplier 22 and then both the results are added by the adder 23 and output.

Referring to FIG. 1D, the predictor 25 receives the transform coefficients y(2) and y(4), and outputs the prediction value of the transform coefficient y(6). When b represents a real number which is above zero and below 1, y(2) is multiplied by b/2 in the multiplier 26, y(4) is multiplied by (2−2b) in the multiplier 27, and then both the multiplication results are added to each other in the adder 28. If the numeral value is represented by a fixed point of the complement of 2, the multipliers 11 and 17 can be implemented by the right shift of one bit, and the multipliers 12 and 16 are implemented by the right shift of 2 bits.

Referring to FIG. 1C, if a=½ in the predictor 20, the multiplier of the multiplier 21 is equal to ⅛, and the multiplier of the multiplier 22 is equal to ¼. If the numeral value is represented by the fixed point of the supplement of 2, the multiplier 21 can be implemented by the right shift of 3 bits, and the multiplier 22 can be implemented by the right shift of 2 bits.

Further, referring to FIG. 1D, if b=½ in the predictor 25, the multiplier of the multiplier 27 is equal to 1, and thus the multiplication is unnecessary. The multiplier of the multiplier 26 is equal to ¼, and if the numeral value is represented by the fixed point of the supplement of 2, the multiplier 26 can be implemented by the right shift of 2 bits.

In FIGS. 2A, 2B, 3A and 3B, predictors 30, 35, 40 and 45 are predictors for two-dimensional 8×8 Hadamard transform.

Referring to FIG. 2A, the predictor 30 receives the transform coefficient y(1,1), and outputs the prediction values of the transform coefficients y(1,3), y(1,7), y(3,1), y(3,3), y(3,7), y(7,1), y(7,3), y(7,7).

For the prediction of the transform coefficients y(1,3) and y(3,1), y(1,1) is multiplied by ½ in the multiplier 31 and then output, and for the prediction of the transform coefficients y(1,7), y(3,3) and y(7,1), y(1,1) is multiplied by ¼ in the multiplier 32 and then output. For the prediction of the transform coefficients y(3,7) and y(7,3), y(1,1) is multiplied by ⅛ in the multiplier 33 and then output, and for the prediction of the transform coefficient y(7,7), y(1,1) is multiplied by ¹⁄₁₆ in the multiplier 34 and then output.

Referring to FIG. 2B, the predictor 35 receives y(1,2), and outputs the prediction values of y(1,4), y(1,6), y(3,2), y(3,4), y(3,6), y(7,2), y(7,4), y(7,6).

For the prediction of the transform coefficients y(1,6) and y(3,2), y(1,2) is multiplied by ½ in the multiplier 36 and then output, and for the prediction of the transform coefficients y(1,4), y(3,6) and y(7,2), y(1,2) is multiplied by ¼ in the multiplier 37 and then output. For the prediction of the transform coefficients y(3,4) and y(7,6), y(1,2) is multiplied by ⅛ in the multiplier 38 and then output, and for the prediction of the transform coefficient y(7,4), y(1,2) is multiplied by ¹⁄₁₆ in the multiplier 39 and then output.

Figure 3B:
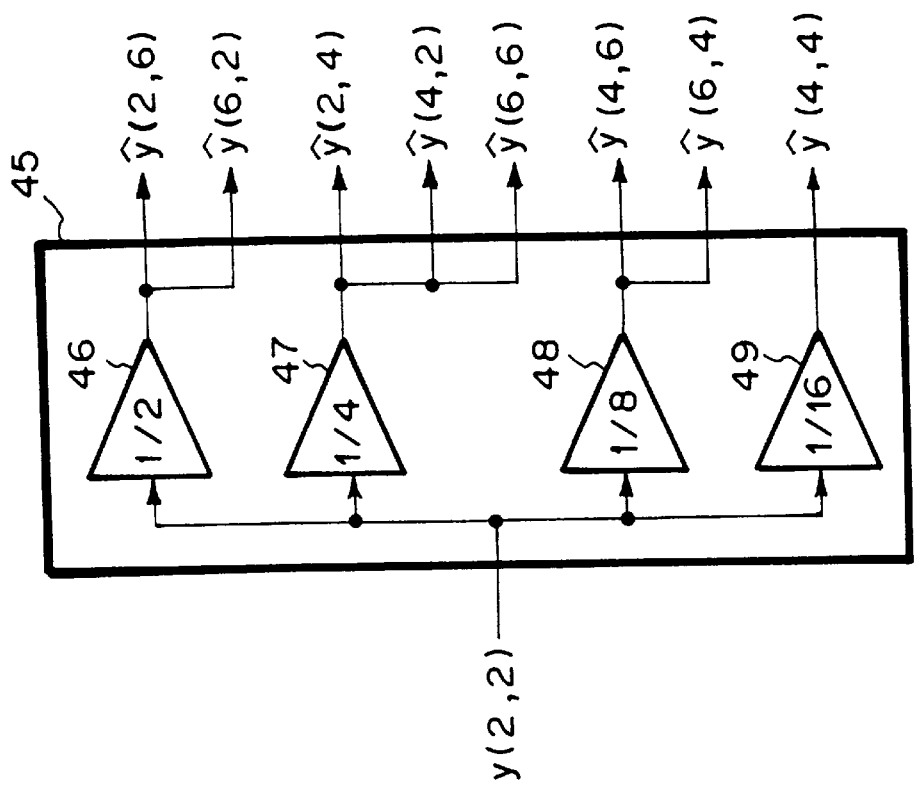
FIGS. 3A and 3B are block diagram showings the construction of a mode of the transform coefficient predictor according to the present invention.
Figure 3A:
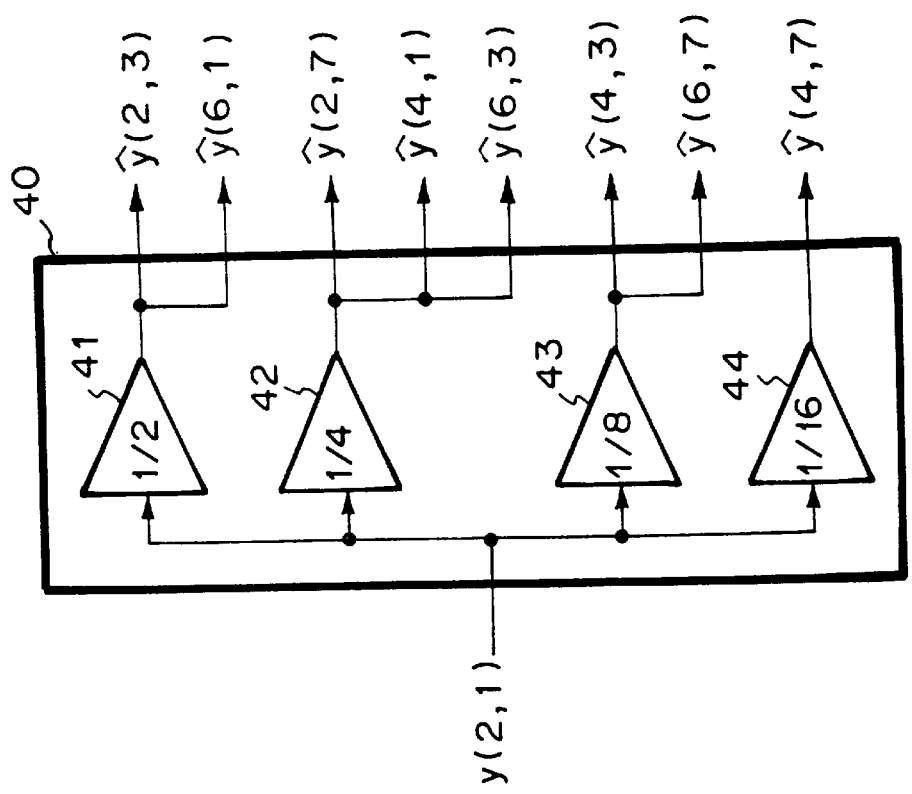

Next, referring to FIG. 3A, the predictor 40 receives the transform coefficient y(2,1) and outputs the prediction values of the transform coefficients y(2,3), y(2,7), y(4,1), y(4,3), y(4,7), y(6,1), y(6,3), y(6,7).

For the prediction of the transform coefficients y(2,3) and y(6,1), y(2,1) is multiplied by ½ in the multiplier 41 and then output, and for the prediction of the transform coefficients y(2,7), y(4,1) and y(6,3), y(2,1) is multiplied by ¼ in the multiplier 42, and for the prediction of the transform coefficients y(4,3) and y(6,7), y(2,1) is multiplied by ⅛ in the multiplier 43 and then output. For the prediction of the transform coefficient y(4,7), y(2,1) is multiplied by ¹⁄₁₆ in the multiplier 44 and then output.

Referring to FIG. 3B, the predictor 45 receives the transform coefficient y(2,2), and outputs the prediction values of the transform coefficients y(2,4), y(2,6), y(4,2), y(4,4), y(4,6), y(6,2), y(6,4), y(6,6).

For the prediction of the transform coefficients y(2,6) and y(6,2), y(2,2) is multiplied by ½ in the multiplier 46 and then output, and for the prediction of the transform coefficients y(2,4), y(4,2) and y(6,6), y(2,2) is multiplied by ¼ in the multiplier 47 and then output. For the prediction of the transform coefficients y(4,6) and y(6,4) is multiplied by ⅛ in the multiplier 48 and then output. For the prediction of the transform coefficient y(4,4), y(2,2) is multiplied by ¹⁄₁₆ in the multiplier 49 and then output.

Here, when the numeral value is represented by the fixed point of the supplement of 2, the multipliers 31, 36, 41 and 46 are implemented by the right shift of one bit, the multipliers 32, 37, 42 and 47 are implemented by the right shift of 2 bits, the multipliers 33, 38, 43 and 48 are implemented by the right shift of 3 bits, and the multipliers 34, 39, 44 and 49 are implemented by the right shift of 4 bits.

Figure 4:
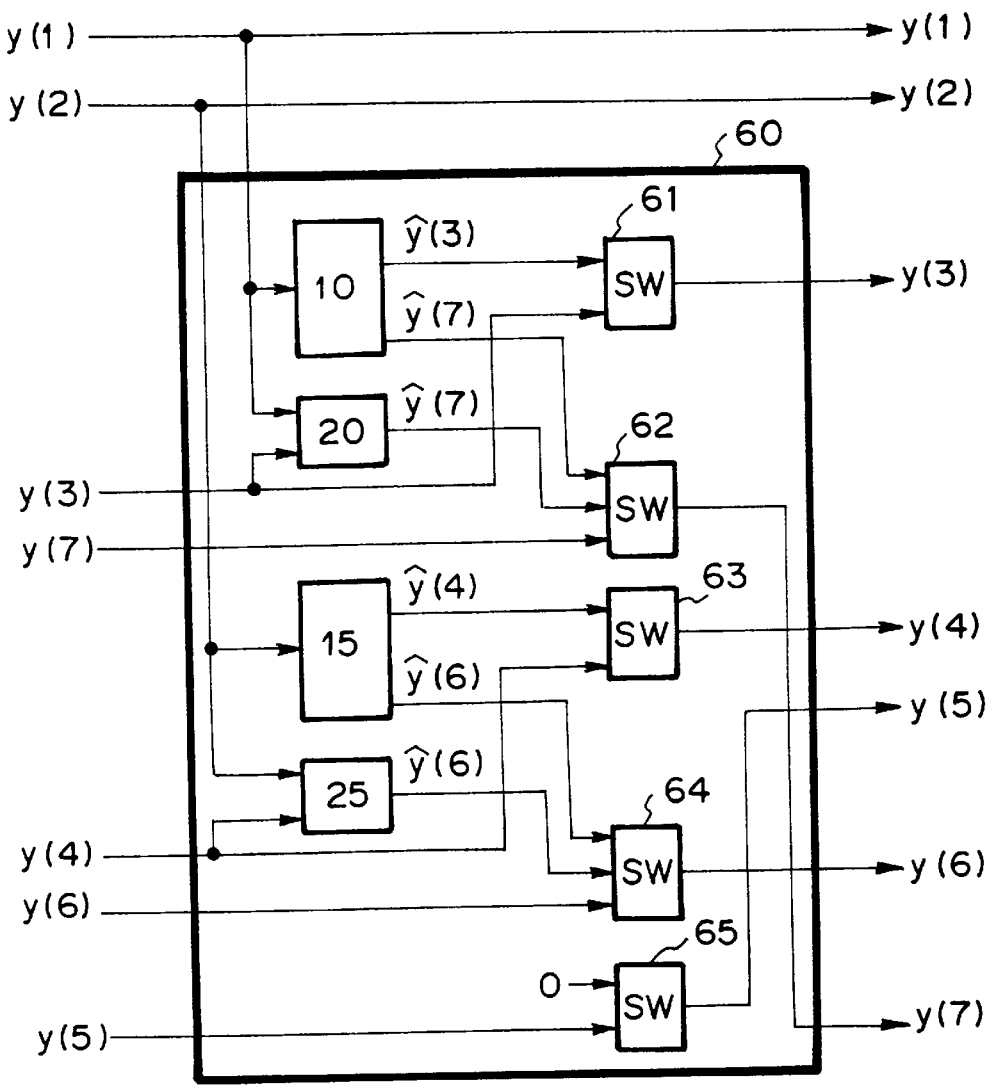
FIG. 4 is a block diagram showing an embodiment of a supplement device of a one-dimensional 8-point Hadamard transform coefficient to which the present invention is applied.

FIG. 4 shows the construction of an embodiment of a transform coefficient supplement device 60 of one-dimensional 8-point Hadamard transform to which the present invention is applied.

In FIG. 4, the predictors 10, 15, 20 and 25 are constructed by the predictors shown in FIG. 1.

Referring to FIG. 4, a switch 61 selects and outputs a prediction value y^(3) from the predictor 10 and the input transform coefficient y(3), and a switch 62 selects and outputs a prediction value y^(7) from the predictor 10 and a prediction value y^(7) from the predictor 20 and the input transform coefficient y(7). A switch 63 selects and outputs a prediction value y^(4) from the predictor 15 and the input transform coefficient y(4), a switch 64 selects and outputs a prediction value y^(6) from the predictor 15, a prediction value y^(6) from the predictor 25 and the input transform coefficient y(6), and a switch 65 selects and outputs zero and the input transform coefficient y(5).

Referring to FIG. 4, when the transform coefficient y(1) is input, but neither y(3) nor y(7) is input, the prediction values of y(3) and y(7) output from the predictor 10 are selected and output by the switch 61 and the switch 62, respectively.

When the transform coefficients y(1) and y(3) are input, but y(7) is not input, the prediction value of y(7) output from the predictor 20 is selected by the switch 62, and the switch 61 selects and outputs the input transform coefficient y(3).

When the transform coefficients y(1), y(3) and y(7) are input, the switch 61 selects and outputs the input transform coefficient y(3), and the switch 62 selects and outputs the input transform coefficient y(7).

When the transform coefficient y(2) is input, but neither y(4) nor y(6) is input, the prediction values of y(4) and y(6) output from the predictor 15 are selected and output by the switches 63 and 64, respectively.

When the transform coefficients y(2) and y(4) are input, but y(6) is not input, the prediction value of y(6) output from the predictor 25 is selected by the switch 64, and the input transform coefficient y(4) is selected and output by the switch 63.

When the transform coefficients y(2), y(4) and y(6) are input, the switch 63 selects and outputs the input y(4), and the switch 64 selects and outputs the input y(6).

The switch 65 selects and outputs the input transform coefficient y(5) when the transform coefficient y(5) is input, and it selects and outputs zero when y(5) is not input.

The transform coefficient supplement device 60 shown in FIG. 4 is applicable to supplement the transform coefficients of the two-dimensional 8×8 Hadamard transform. That is, as show in FIG. 5, it is applicable to the supplement of the transform coefficients y(0,1), y(0,2), . . . , y(0,7), and likewise it is also applicable to the supplement of y(1,0), y(2,0), . . . , y(7,0).

FIGS. 6 and 7 show the construction of an encoder and the construction of a decoder which use the one-dimensional 8-point Hadamard transform to which the present invention is applied. FIGS. 6 and 7 are separately illustrated for the convenience of preparation of drawings.

Referring to FIG. 6, in the encoder, after an input signal is received in a buffer 71, it is read out every 8 samples, and subjected to Hadamard transform by an Hadamard transformer 72. Reference numeral 73 represents a quantizer for transforming the transform coefficients y(0) to y(7) to discrete values.

The prediction values of the transform coefficients y(3) and y(7) are calculated from the transform coefficient y(1) by the transform coefficient predictor 10 shown in FIG. 1A, and prediction errors for the prediction values are calculated by subtractors 75 and 76, respectively.

Likewise, the prediction values of the transform coefficients y(4) and y(6) are calculated from the transform coefficient y(2) by the transform coefficient predictor 15 shown in FIG. 1B, and prediction errors for these prediction values are calculated by subtractors 77 and 78, respectively.

In a variable-length encoder 74, the transform coefficients are transformed to coded words in accordance with the appearance frequency of the values of the transform coefficients.

Referring to FIG. 7, in the decoder, the coded words which are generated by the variable-length encoder 74 are restored to the original values in a variable-length decoder 84.

The prediction values of the transform coefficients y(3) and y(7) are calculated from the transform coefficient y(1) output from the variable-length decoder 84 by using the transform coefficient predictor 10 shown in FIG. 1A, and are respectively added with the corresponding outputs of the variable-length decoder in an adder 85 and an adder 86, respectively.

Further, the prediction values of the transform coefficients y(4) and y(6) are calculated from the transform coefficient y(2) output from the variable-length decoder 84 by using the transform coefficient predictor 15 shown in FIG. 1B, and then are added with the corresponding outputs of the variable-length decoder in an adder 87 and an adder 88, respectively.

The transform coefficients which are subjected to the above processing are inversely quantized in an inverse quantizer 83, and then subjected to inverse Hadamard transform in an inverse Hadamard transformer 82. The output of the inverse Hadamard transformer 82 is input to a buffer 81, and output every sample.

As described above, when the predictor is applied to the coding of the present invention, the coding amount of the transform coefficients can be reduced. Further, when the predictor of the present invention is applied to a decoding device for progressive coding of successively transmitting transform coefficients from the lower-order to the higher-order, smooth decoding waveform can be obtained even in a transmission initial stage where there exist only the lower-order coefficients.

As described above, according to the present invention, for the transform coefficients of the Hadamard transform, the values of the transform coefficients from the lower-order transform coefficients to the higher-order transform coefficients can be predicted in the block. At this time, it is assume that the inversely transformed signal waveform is smooth.

Figure 8A:
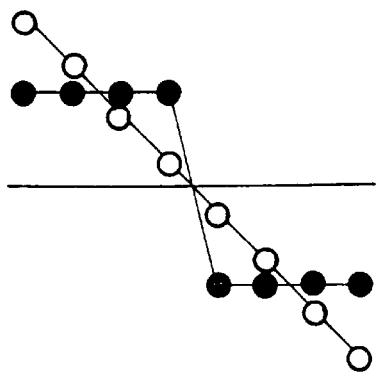
FIGS. 8A to 8D are signal waveform diagrams showing the operation of the mode of the present invention.

For example, the waveform which is represented by the transform coefficient y(1) of the one-dimensional 8-point Hadamard transform is expressed by black dots in FIG. 8A, and there is a step at the center of the block. In the transform coefficient predictor 10, the prediction values of the transform coefficients y(3) and y(7) are calculated on the assumption of a waveform having no step as expressed by white dots of FIG. 8A.

Figure 8B:
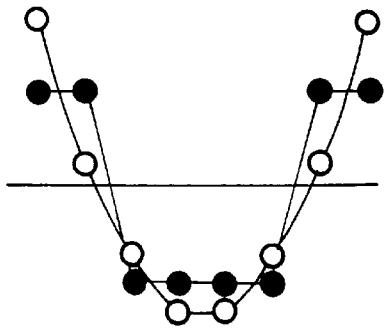

Likewise, the waveform represented by the transform coefficient y(2) is indicated by black dots in FIG. 8B, and two steps occur in the block. In the transform coefficient predictor 15, the prediction values of the transform coefficients y(4) and y(6) are calculated on the assumption of a waveform having no step as indicated by white dots of FIG. 8B.

Figure 8C:
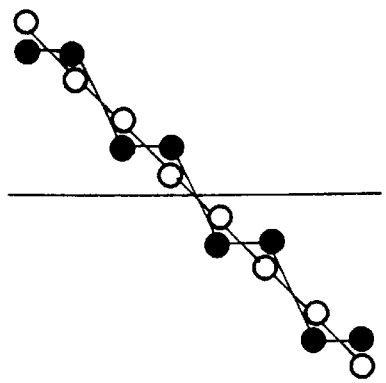
Figure 8D:
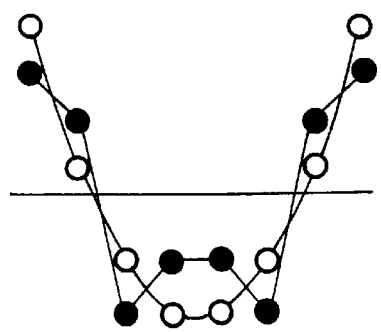

In the transform coefficient predictors 20 and 25, the prediction values of the transform coefficients y(7) and y(6) are calculated on the assumption of waveform as indicated by black dots and white dots in FIGS. 8C and 8D.

As described above, according to the present invention, the values from the lower-order transform coefficients to the higher-order transform coefficients in the block can be predicted for the transform coefficients of the Hadamard transform.

Further, when the present invention is applied to the coding, the coding amount of the transform coefficients can be reduced.

Still further, if the present invention is applied to the supplement device of the transform coefficients, when the transform coefficients are successively transmitted from the lower-order transform coefficients to the higher-order transform coefficients, a smooth inversely-transformed signal can be obtained in the block even at the transmission initial stage where there are only the low-order transform coefficients.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A Hadamard transform coefficient predictor for performing variable length encoding and decoding for image signal processing, comprising:

when the transform coefficients of one-dimensional 8-point Hadamard transform are represented by y(0), y(1), . . . , y(7) in the order from the lowest order, a first prediction unit for receiving y(1) and then multiplying y(1) by ½ to output the multiplication result as a prediction value of y(3); and a second prediction unit for receiving y(1) and then multiplying y(1) by ¼ to output the multiplication result as a prediction value of y(7).

* * * * *